(12) United States Patent
Lee

(10) Patent No.: US 10,419,904 B2
(45) Date of Patent: Sep. 17, 2019

(54) MOBILE CONNECTIVITY AND SELF-GENERATING ILLUMINATION ELECTRIC SCOOTER

(71) Applicant: Neuron Corporation, Costa Mesa, CA (US)

(72) Inventor: Edward Lee, Costa Mesa, CA (US)

( * ) Notice: Subject to any disclaimer, the term of this patent is extended or adjusted under 35 U.S.C. 154(b) by 0 days.

(21) Appl. No.: 16/169,330

(22) Filed: Oct. 24, 2018

(65) Prior Publication Data
US 2019/0058982 A1 Feb. 21, 2019

(51) Int. Cl.
| | |
|---|---|
| *B62K 11/00* | (2006.01) |
| *H04W 4/40* | (2018.01) |
| *B60L 11/18* | (2006.01) |
| *B60Q 7/00* | (2006.01) |
| *B62K 19/40* | (2006.01) |
| *H02J 7/00* | (2006.01) |
| *B62L 1/00* | (2006.01) |

(52) U.S. Cl.
CPC ........... *H04W 4/40* (2018.02); *B60L 11/1809* (2013.01); *B60Q 7/005* (2013.01); *B62K 19/40* (2013.01); *B62L 1/005* (2013.01); *H02J 7/0044* (2013.01); *B60Y 2200/126* (2013.01); *B62K 2202/00* (2013.01); *B62K 2204/00* (2013.01)

(58) Field of Classification Search
CPC . B62K 2202/00; B62K 2204/00; H04W 4/40; B62D 61/02; B60K 7/00
USPC ...................................... 180/220; 280/87.021
See application file for complete search history.

(56) References Cited

U.S. PATENT DOCUMENTS

| | | | | |
|---|---|---|---|---|
| 5,775,452 | A * | 7/1998 | Patmont | B62D 61/02 180/181 |
| 6,227,324 | B1 * | 5/2001 | Sauve | B62D 61/02 180/181 |
| 6,318,491 | B1 * | 11/2001 | Tung | B60T 1/04 180/180 |
| 7,040,443 | B1 * | 5/2006 | Roth | B62K 3/002 180/220 |
| 8,662,508 | B2 * | 3/2014 | Grossman | A63C 17/26 280/11.203 |
| 2002/0088659 | A1 * | 7/2002 | Wong | B62D 61/02 180/220 |

(Continued)

*Primary Examiner* — Tony H Winner
(74) *Attorney, Agent, or Firm* — Elizabeth Yang

(57) ABSTRACT

A mobile connectivity and self-generating illumination electric scooter comprises a step-through frame, and is operable as a plug-in electric vehicle with two or three wheels operational inside the wheels. A rechargeable battery stores electricity to drive the electric motor. The scooter also includes: a glossy finish, a rectangular front frame member, an aerodynamic manual brake fin, a communication device support member, detachable floor and front panels having multiple colors and designs, On/Off digital locking system, an accelerator handle and a brake handle differentiated by color; and further, an integral computer, an integrated router forming a Wi-Fi hotspot, a daytime running lamp, a help switch, a sound system, a camera for livestream and social media synchronization, a communication device charger, an integral GPS. The mobile communication device is in communication with, and controls at least one of: the integral computer, the Wi-Fi hotspot, speaker system, camera, help switch, and the GPS.

14 Claims, 8 Drawing Sheets

(56) References Cited

U.S. PATENT DOCUMENTS

| | | | | |
|---|---|---|---|---|
| 2004/0079571 A1* | 4/2004 | Laver | .................... | B62K 3/002 |
| | | | | 180/180 |
| 2011/0031711 A1* | 2/2011 | Grossman | ................ | B62J 6/003 |
| | | | | 280/87.041 |
| 2012/0048636 A1* | 3/2012 | Huang | .................... | B60B 19/00 |
| | | | | 180/220 |
| 2013/0186702 A1* | 7/2013 | Hadley | ................... | F16D 49/00 |
| | | | | 180/220 |
| 2014/0090916 A1* | 4/2014 | Lovley, II | .............. | B62K 3/002 |
| | | | | 180/220 |

\* cited by examiner

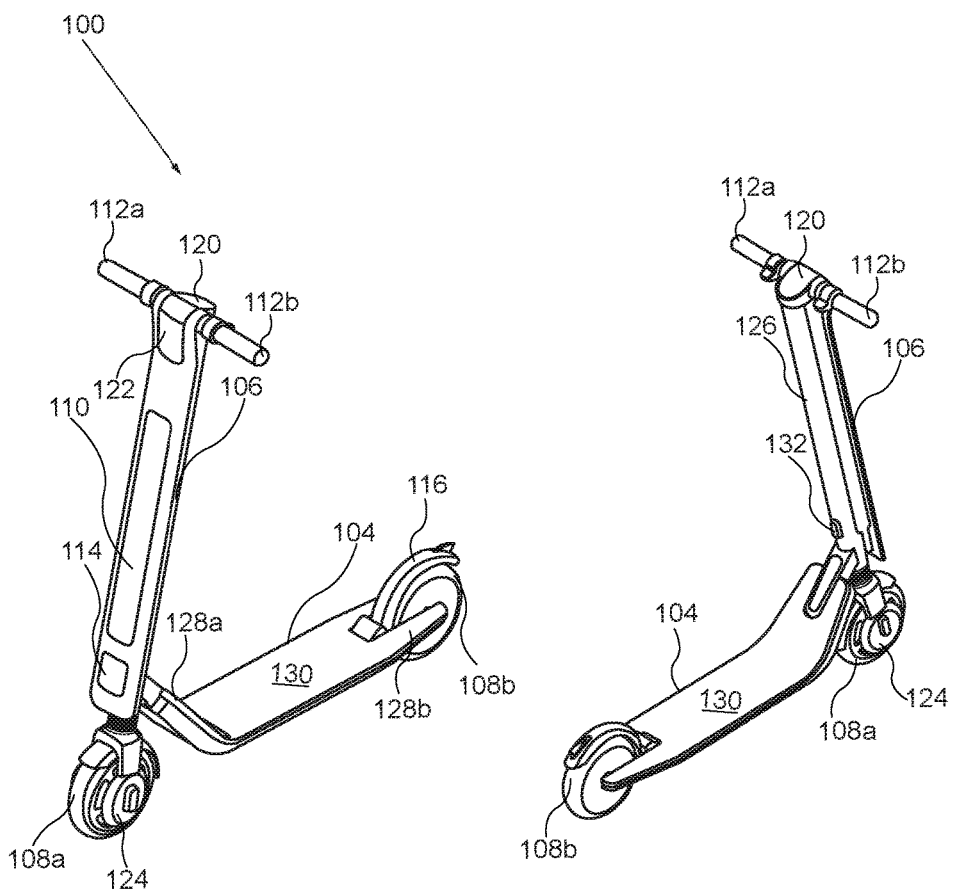

MOBILE CONNECTIVITY AND SELF-GENERATING ILLUMINATION ELECTRIC SCOOTER

FIELD OF THE INVENTION

The present invention relates generally to a mobile connectivity and self-generating illumination electric scooter. More so, the present invention relates to an electric scooter that is configured with a step-through frame and operable as a plug-in electric vehicle with two or three wheels, and having electricity stored on board in a rechargeable battery to drive an electric motor; whereby the electric scooter provides structural novelty through use of: a slim aesthetic design with a glossy finish, a shield-shaped front frame member, an aerodynamic manual brake fin, a communication device support member, detachable decorative panels having with multiple colors and designs that cover a slim floor platform a front frame member, an electric motor operable in the wheels, a power (On/Off) digital locking system, and an accelerator handle and a brake handle differentiated by color; and whereby the electric scooter provides novel wireless connectivity through use of: an integral computer, an integrated Wi-Fi hotspot, a daytime running lamp, a help button, a sound system that includes a speaker for audio navigation and general audio synchronization, a camera for livestream and/or social media synchronization, a video streaming device, a device charger, and an integral global positioning system; and whereby the wireless connectivity is controllable through a mobile communication device and the mobile communication device is in communication with the computer, the Wi-Fi hotspot, the speaker system, the camera, the help switch, and the global positioning system.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, electric vehicles include a bank of rechargeable batteries that propel the vehicle. While electric vehicles may be effective at supplying the motor with enough electricity to propel the vehicle through various power demand situations, the limited driving range and the long recharge time of the batteries are substantial drawbacks that limit the legitimacy of the electric vehicle as a practical solution to the current problem. It is known in the art that electric scooters have a bank of batteries which provide power to drive an electric motor. However, the batteries must be recharged from time to time. This is typically done by plugging the batteries into an AC power outlet for some period of time to restore the depleted energy.

Generally, vehicles have a sound system and a security system. The sound system usually consists of an AM/FM radio, a cassette or CD (compact disk) player, an equalizer/amplifier, and speakers. The radio and player are arranged in a metal casing or housing that is mounted in a dashboard of the vehicle. Further, vehicles are being equipped with a navigation system that incorporates a global positioning system (GPS) receiver. The GPS receiver has an antenna to receive signals from a satellite network. The vehicle navigation system uses the satellite positioning signals to compute coordinates that locate the vehicle over the surface of the earth with regard to longitude, latitude, and altitude. Also, with the appropriate map software, the vehicle's location can then be shown on a map.

In many instances, cellular communications systems have been added to vehicles. These communications systems enable the vehicle driver or occupant to transact telephone calls from their vehicle. Some systems are voice controlled which permit the driver to initiate or receive calls while traveling without removing a hand from the driving wheel, or diverting the eyes from the operation of the vehicle.

Other proposals have involved Internet connectivity vehicles. The problem with these vehicles is that they do not provide electrical energy simultaneously with connectivity to a personal communication device. Also, they do not provide aesthetic design features. Even though the above cited Internet connectivity vehicles meet some of the needs of the market, a mobile connectivity and self-generating illumination electric scooter that provides both transportation and communication means simultaneously. The scooter is operable with a mobile communication device that controls multiple electrical and wireless communication components used in the scooter; whereby the scooter is also designed with aesthetics in mind, providing detachable panels having various colors and designs to enhance appeal; and further providing a glossy finish, sleek lines, and a floor platform with a narrow skateboard design, is still desired.

SUMMARY

Illustrative embodiments of the disclosure are generally directed to a mobile connectivity and self-generating illumination electric scooter. The electric scooter is configured with a step-through frame that allows for easy riding. The step-through arrangement allows for easy one-easy off riding. The frame is also unique and aesthetic through use of a slim aesthetic design with a glossy finish, a shield-shaped front frame member, an aerodynamic manual brake fin, a communication device support member, and at least one detachable decorative panel that cover a slim floor platform and shield-shaped front frame member.

The electric scooter further utilizes an accelerator handle and a brake handle differentiated by color. This allows for easy recognition of the acceleration and braking means while operating the electric scooter at high speeds or while distracted. The electric scooter is also operable as a plug-in electric vehicle with two or three wheels, harnessing electricity that is stored on board in a rechargeable battery to drive an electric motor. The electric motor is operable in the wheels, such as the front wheel. The electric scooter also provides an On/Off digital locking system that inhibits unauthorized starting of the electric motor. A daytime running lamp automatically switches on when the electric scooter is moving, emitting white, yellow, or amber light to increase the conspicuity of the electric scooter during both daylight and night hours.

In addition to the structural novelty, the electric scooter provides novel wireless connectivity through use of: an integral computer that processes a substantial amount of electrical and communication components of the electric scooter. The electric scooter may also include an integrated Wi-Fi hotspot that can be used by multiple communication devices for Internet connectivity. The electric scooter also utilizes a help button to enable visual and audible communications indicating trouble, i.e., S.O.S. A device charger may also be operational at or near the communication device support member.

The electric scooter may also include a sound system that includes a speaker for audio navigation and general audio synchronization. The sound system may also include microphones, signal processors, amplifiers, and loudspeakers in enclosures. These audio components may be controlled by a mixing console that makes live or pre-recorded sounds louder and distribute the sounds. The electric scooter may also include a camera for livestream and/or social media synchronization, and a video streaming device.

The electric scooter is unique in that the wireless connectivity is controllable through a mobile communication device. Thus, the mobile communication device, such as a smart phone, is in communication with the computer, Wi-Fi hotspot, speaker system, camera, and other wireless connectivity features of the electric scooter. This creates, in essence, a motorized mobile phone.

In one aspect, a mobile connectivity and self-generating illumination electric scooter, comprises:
  a step-through frame comprising a floor platform defined by a front end and a rear end, the floor platform carrying at least two wheels, the wheels being rotatable to advance the electric scooter,
  the frame further comprising a steering column extending from the floor platform, the steering column terminating at an accelerator handle and a brake handle, the handles being operatively connected to the wheels, the handles having different colors, whereby manipulating the accelerator handle increases angular velocity of the wheels, and manipulating the brake handle decreases angular velocity of the wheels,
  the frame further comprising a front frame member overlaying the steering column, the front frame member being at least partially transparent,
  the frame further comprising a manual brake fin operatively connected to the brake handle and at least one of the wheels, whereby the manual brake fin is operable to at least partially restrict rotation of one of the wheels when the brake handle is manipulated,
  the frame further comprising a communication device support member disposed between the accelerator handle and the brake handle, the communication device support member operable to enable support of a mobile communication device;
  a plurality of interchangeable floor panels detachably covering the floor platform;
  a plurality of interchangeable front panels detachably covering the front frame member;
  a rechargeable battery storing electricity, the rechargeable battery disposed between the steering column and the front frame member;
  a device charger in electrical communication with the rechargeable battery, the device charger being proximal to the communication device support member, whereby the device charger is operable to charge the mobile communication device;
  an electric motor in electrical communication with the rechargeable battery, the electric motor disposed on or near at least one of the wheels, the electric motor being operatively connected to the accelerator handle and the wheels, whereby the electric motor drives the wheels;
  a digital locking system operatively connected to the electric motor the digital locking system operable to selectively restrict operation of the electric motor;
  a daytime running lamp disposed between the steering column and the front frame member, the daytime running lamp automatically illuminating when the electric motor is operational, whereby the daytime running lamp illuminates through the at least partially transparent front frame member;
  an integral router forming a Wi-Fi hotspot, the Wi-Fi hotspot operable to enable Internet connectivity for the mobile communication device;
  a help switch transmitting a signal, the signal indicating irregular events at or near the electric scooter;
  a sound system generating and mixing sound;
  a camera;
  a global positioning system integral in the frame; and
  an integral computer operable to regulate the electrical connections and process the wireless communications, the integral computer further being in communication with the mobile communication device through the Wi-Fi hotspot.

In another aspect, the frame is defined by a glossy finish.

In another aspect, the scooter further comprises a reflector affixed to the front frame member.

In another aspect, the front frame member has an elongated, rectangular shape.

In another aspect, the steering column is about 45 inches long.

In another aspect, the floor platform is about 40 inches long.

In another aspect, the rechargeable battery receives a power charge from an external power source.

In another aspect, the rechargeable battery includes at least one of the following: a Lithium-Ion Battery, a Nickel-Metal Hydride Battery, a Lead-Acid Battery, and an Ultracapacitor.

In another aspect, the accelerator handle and the brake handle form grips.

In another aspect, the communication device support member is flat.

In another aspect, the device charger comprises a retractable cord.

In another aspect, the mobile communication device comprises a smart phone.

In another aspect, the interchangeable floor panels include multiple colors and designs.

In another aspect, the interchangeable front panels include multiple colors and designs.

In another aspect, the sound system includes at least one of the following: a speaker, a mixer, a microphone, a signal processor, an amplifier, and a loudspeaker.

In another aspect, the camera is disposed at or near the front frame member.

In another aspect, the camera is operable to enable livestream viewing of the area near the electric scooter, and further operable to enable social media synchronization.

In another aspect, the help switch is a button.

In another aspect, the signal is generated by depressing the button.

In another aspect, the signal from the help switch transmits to a vehicle repair receiver, or a law enforcement receiver, or a medical assistance receiver.

In another aspect, the manual brake fin has an aerodynamic shape.

One objective of the present invention is to provide an electric scooter that is operable as a mobile communication device, computer, and multi-media system.

Another objective is to provide interchangeable, ornamental panels to cover the frame of the electric scooter.

Yet another objective is to enable support and recharging for a smart phone or tablet directly on the electric scooter.

Yet another objective is to help a scooter operator visually discern the accelerator from the brake through use of color-coded handles.

Yet another objective is to provide an electric motor hidden in the wheels.

Yet another objective is to provide an inexpensive to manufacture mobile connectivity and self-generating illumination electric scooter.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 2 illustrates a front perspective view of an exemplary mobile connectivity and self-generating illumination electric scooter, in accordance with an embodiment of the present invention;

FIG. 3 illustrates a rear perspective view of the mobile connectivity and self-generating illumination electric scooter shown in FIG. 2, in accordance with an embodiment of the present invention;

FIG. 9A shows the electric scooter and FIG. 9B shows the electric bike, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A mobile connectivity and self-generating illumination electric scooter 100 is referenced in FIGS. 1-10. The mobile connectivity and self-generating illumination electric scooter 100, hereafter "scooter 100" provides both transportation and communication means simultaneously. The scooter 100 is operable with a mobile communication device 200 that controls multiple electrical and wireless communication components used in the scooter 100. The scooter 100 is also designed with aesthetics in mind, providing detachable panels having various colors and designs to enhance appeal; and further providing a glossy finish 130, sleek lines, and a floor platform 104 with a narrow skateboard design.

The electric scooter 100 is intended for public sharing of mobility (transportation), internet connectivity, and digital culture development. This creates a multi-use transportation means that is ergonomic, aesthetic, and functional for transportation purposes. Further, the electric scooter is intended for retail to consumers. This allows the general public to benefit from the advantages discussed below.

Figure 1:
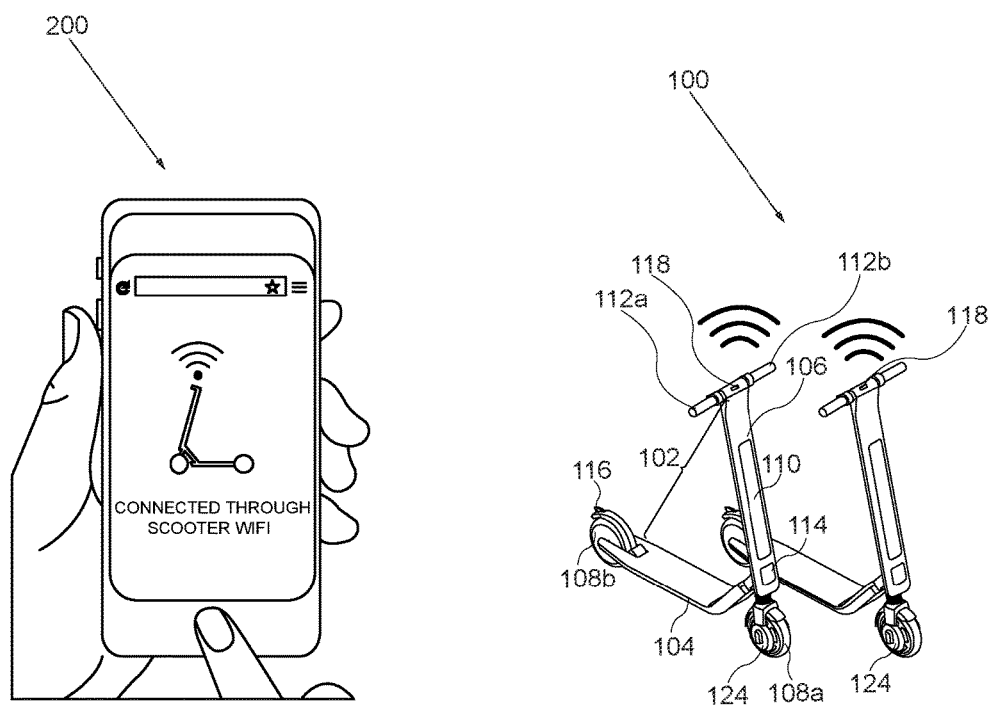
FIG. 1 illustrates a perspective view of an exemplary mobile connectivity and self-generating illumination electric scooter in communication with a mobile communication device, in accordance with an embodiment of the present invention.

As referenced in FIG. 1, the scooter 100 comprises a step-through frame 102 for easy loading and unloading. The frame 102 also has a modern, sleek look. The frame 102 is defined by a glossy finish 130 that creates even greater aesthetics. In some embodiments, the frame 102 is coated with a finish that is customizable, provided in various materials generally aluminum, finished in gloss and matte.

In one embodiment, the frame 102 includes a floor platform 104 on which the operator stands. The floor platform 104 is defined by a front end 128a, oriented towards a forward direction and a steering column 126. The floor platform 1094 is also defined by a rear end 128b oriented towards the reverse direction of the scooter 100, at the manual brake fin 116.

In some embodiments, the floor platform 104 carries at least two wheels 108a, 108b that are rotatable to advance the electric scooter 100. The wheels 108a, 108b may be a hardened rubber forming a cavity that contains an electric motor 124, or supports an electric motor 124 on the outer surface of a wheel. In one non-limiting embodiment, the floor platform 104 is about 40" long. In one alternative embodiment, three or four wheels may be used with scooter 100.

In one non-limiting embodiment, the electric motor 124 utilizes a gearbox which produces different rotation ratio between a drive motor and drive wheels during running of the electric scooter 100, a differential which serves to absorb a power of the gearbox to overcome rotation speed difference between the drive wheels, and two wheel axles which are used to deliver the power to the drive wheels from the differential. Though other electrical vehicle powering and gear means known in the art may also be used.

The frame 102 further comprises a steering column 126 extending perpendicularly from the floor platform 104. The operator can turn the steering column in the desired direction during operation of the scooter. In one non-limiting embodiment, the steering column 126 is about 45" long. Though in other embodiments, the steering column can be shorter, longer, or even height adjustable.

The steering column 126 terminates at an accelerator handle 112*a* and a brake handle 112*b*. The handles 112*a-b* are operatively connected to the wheels 108*a-b*, so as to accelerate or decelerate the angular velocity of the wheels 108*a-b*; and thereby the speed of the scooter 100. For example, manipulating the accelerator handle 112*a* increases angular velocity of the wheels 108*a*, 108*b*, and manipulating the brake handle 112*b* decreases angular velocity of the wheels 108*a*, 108*b*. The handles 112*a-b* are defined by different colors to help visually discern the accelerator from the brake. This can be useful when operating at high speeds or with distractions. Further, the accelerator handle 112*a* and the brake handle 112*b* form grips that allow the operator to more effectively steer the scooter 100.

Figure 7:
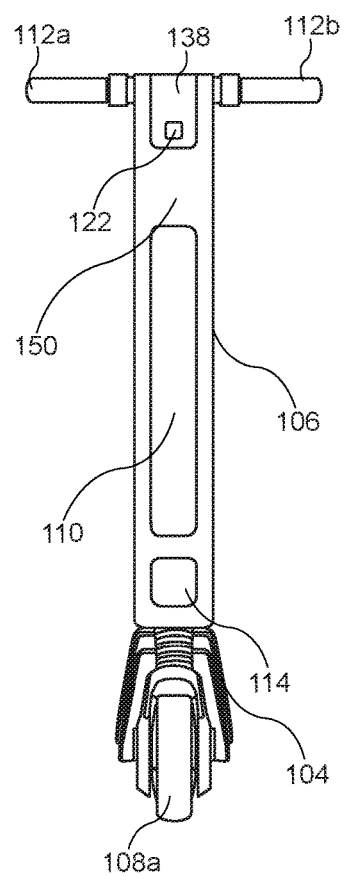
FIG. 7 illustrates a frontal view of the mobile connectivity and self-generating illumination electric scooter shown in FIG. 2, in accordance with an embodiment of the present invention.

As illustrated in FIG. 2, the frame 102 further includes a front frame member 106 that overlays the steering column 126. The front frame member 106 forms the foremost vanguard that protects the operator from wind and debris while operating the scooter 100 in a forward direction. In one embodiment, the front frame member 106 has an elongated, rectangular shape. The front frame member 106 is flat so as to prevent bugs, wind, and moisture from striking the operator while riding the scooter 100. The front frame member 106 is at least partially transparent. The transparent portion of the front frame member 106 may include an elongated window that allows light to pass through (FIGS. 2 and 7). Though in other embodiments, the entire front frame member 106 is partially opaque. In another embodiment, the front frame member 106 has a vertical-shaped daytime running lamp.

Turning now to FIG. 3, the frame 102 further comprising a manual brake fin 116 operatively that connects to the brake handle 112*b* and at least one of the wheels 108*a*, 108*b*. The manual brake fin 116 is operable to at least partially restrict rotation of one of the wheels 108*a-b* when the brake handle 112*b* is manipulated. In one non-limiting embodiment, the manual brake fin 116 has an aerodynamic shape to further enhance the ornamental effects of the frame 102.

Figure 4:
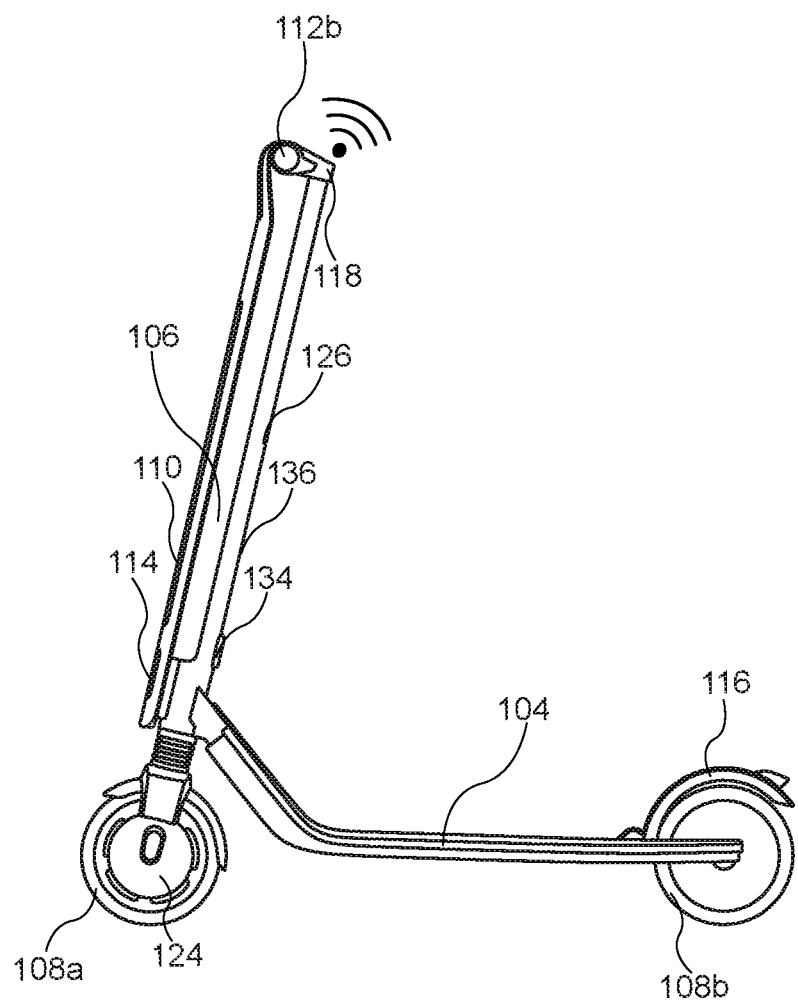
FIG. 4 illustrates a side view of the mobile connectivity and self-generating illumination electric scooter shown in FIG. 2, emitting a signal from a Wi-Fi hotspot, in accordance with an embodiment of the present invention.

As FIG. 4 references, the frame 102 also includes a communication device support member 120 that is disposed between the accelerator handle 112*a* and the brake handle 112*b*. The communication device support member 120 is operable to support of a mobile communication device 200. In one embodiment, the communication device support member 120 is flat. Though in other embodiments, the communication device support member 120 is slightly bowed, so as to cradle the mobile communication device 200. The communication device support member 120 may include a magnet that retains the mobile communication device 200 in a stable position while operating the scooter 100. This can be useful when the scooter 100 leans to the left or right, or accelerates quickly.

Figure 5:
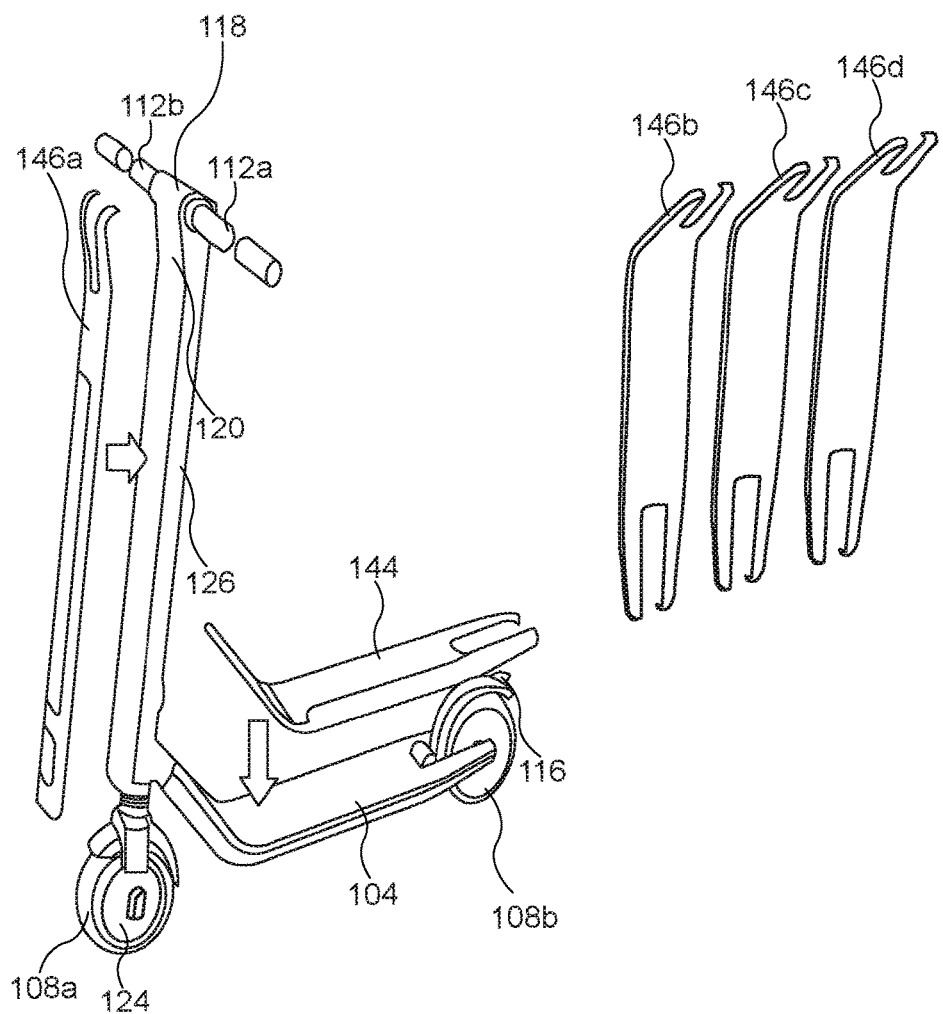
FIG. 5 illustrates a rear perspective view of the mobile connectivity and self-generating illumination electric scooter with interchangeable front panels and floor panels, in accordance with an embodiment of the present invention.
Figure 6:
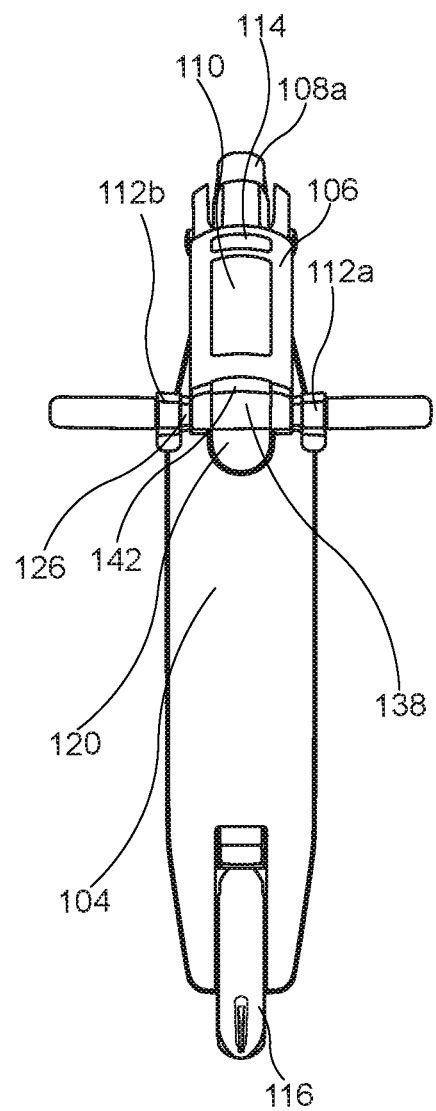
FIG. 6 illustrates a top view of the mobile connectivity and self-generating illumination electric scooter shown in FIG. 2, in accordance with an embodiment of the present invention.

As shown in FIG. 5, the scooter 100 may further include a plurality of interchangeable floor panels 144 detachably covering the floor platform 104. The floor panels 114 overlay the floor platform 104, providing an additional surface—chiefly for aesthetics. Similarly, a plurality of interchangeable front panels 146*a-d* detachably cover the front frame member 106. The interchangeable floor panels 144 include multiple colors and designs. FIG. 5 shows a red, white, and blue series of panels 144, 146*a-d* that enhance the ornamental effect. The floor and front panels 146*a-d* can snap-on or be fastened through a bolt, screw, or magnet to the frame 102.

In some embodiments, the scooter 100 comprises a rechargeable battery 132 that stores electricity for powering the electric motor 124. The rechargeable battery 132 must be recharged from time to time. This is typically done by plugging the rechargeable battery 132 into an AC power outlet for some period of time to restore the depleted energy. The rechargeable battery 132 may be disposed between the steering column 126 and the front frame member 106. The rechargeable battery 132 can be a battery pack that is modular and easily concealed in the frame 102. In some embodiments, the rechargeable battery 132 may include, without limitation, a lithium-ion battery, a nickel-metal hydride battery, a lead-acid battery, and an ultra-capacitor. In one embodiment, the rechargeable battery 132 receives a power charge from an external power source.

As discussed above a mobile communication device 200 is operable with the scooter 100. The mobile communication device 200 may include, without limitation, a smart phone, a tablet, and a laptop. Thus, the scooter 100 utilizes a device charger 134 that is in electrical communication with the rechargeable battery 132 for recharging means. The device charger 134 is proximal to the communication device support member 120. The device charger 134 is operable to charge the mobile communication device 200. In one non-limiting embodiment, the device charger 134 comprises a retractable cord 136 that extends the reach for recharging.

Referring to FIG. 2 and FIG. 3 of the drawings, the electric motor 124 is in electrical communication with the rechargeable battery 132. The electric motor 124 may be disposed on or near at least one of the wheels 108*a*, 108*b*. As the figure shows, the electric motor 124 is encased in a hard cover on the surface of the wheel. Though in other embodiments, the electric motor 124 may be inside the wheel, or adjacent to the wheel. The electric motor 124 being operatively connected to the accelerator handle 112*a* and the wheels 108*a-b*, whereby the electric motor 124 drives the wheels 108*a-b*.

In some embodiment, the scooter 100 utilizes a digital locking system 148 as a security feature to prevent unauthorized users. The digital locking system 148 is configured to operatively connect to the electric motor 124, so as to selectively restrict operation of the electric motor 124. The digital locking system 148 may include an On/Off switch that is locked and unlocked through a code or a physical key.

As the frontal view of scooter 100 in FIG. 7 references, a daytime running lamp 110 is operable to face the front of the scooter 100, illuminating through the front frame member 106. The daytime running lamp 110 automatically illuminates when the electric motor 124 is operational. The daytime running lamp 110 does not draw energy from the rechargeable battery 132 due to the self-generating functionality. The front frame member 106 may be elongated and have a vertical shape to support the daytime running lamp 110.

In one embodiment, the daytime running lamp 110 is disposed between the steering column 126 and the front frame member 106. The daytime running lamp 110 illuminates through the transparent front frame member 106. In one non-limiting embodiment, the scooter 100 further comprises a reflector 114 affixed to the front frame member 106. The reflector 114 also provides safe visibility of the scooter 100; especially in the dark. The reflector may have multiple shiny, colorful colors that reflect light to draw attention to the scooter.

Figures 10A, 10B, 10C, 10D:
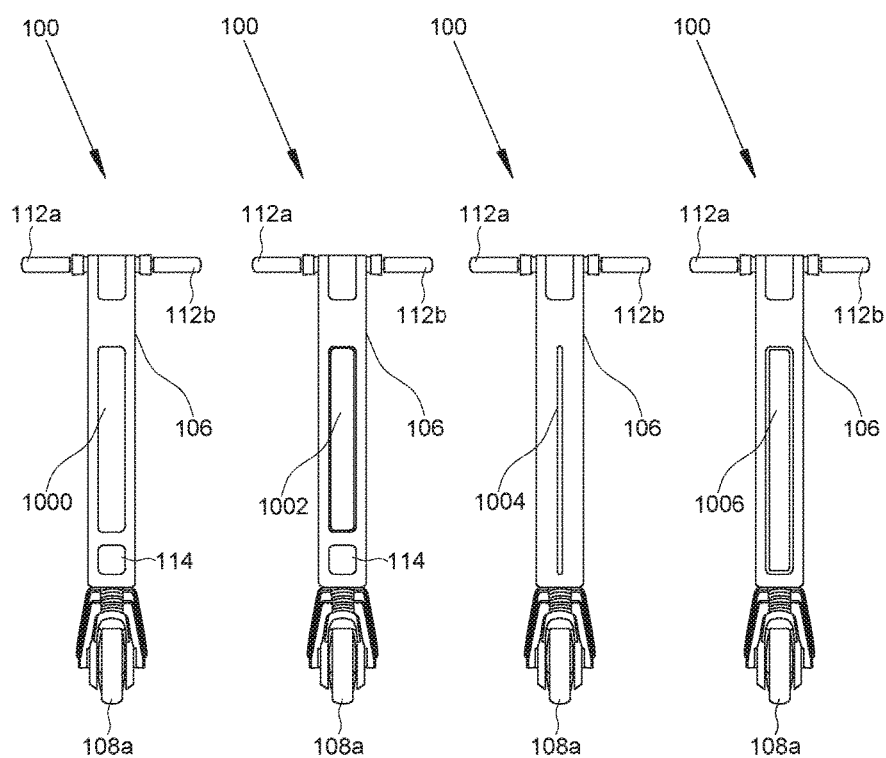
FIGS. 10A, 10B, 10C, 10D illustrate different variations of the vertical LED headlight, in accordance with an embodiment of the present invention.

FIGS. 10A-10D illustrate different variations of the vertical LED headlight. FIG. 10A shows electric scoter 100 having a first embodiment daytime running lamp 1000 with elongated and wide configuration, above a reflector 114. FIG. 10B shows electric scoter 100 having a second embodiment daytime running lamp 1002 with elongated perimeter lighting and wide configuration, above a reflector 114. FIG. 10C shows electric scoter 100 having a third embodiment daytime running lamp 1004 with elongated lighting and thin configuration, not utilizing a reflector 114. FIG. 10D shows electric scoter 100 having a fourth embodiment daytime running lamp 1006 with elongated perimeter lighting, not utilizing a reflector 114.

As discussed above, the scooter 100 operates as a mobile transportation and communication mechanism. The scooter 100 can be driven, while also enabling wireless communications. For this function, the scooter 100 utilizes an integral router 118 that forms a Wi-Fi hotspot. The Wi-Fi hotspot is operable to enable Internet connectivity for the mobile communication device 200.

Figure 8:
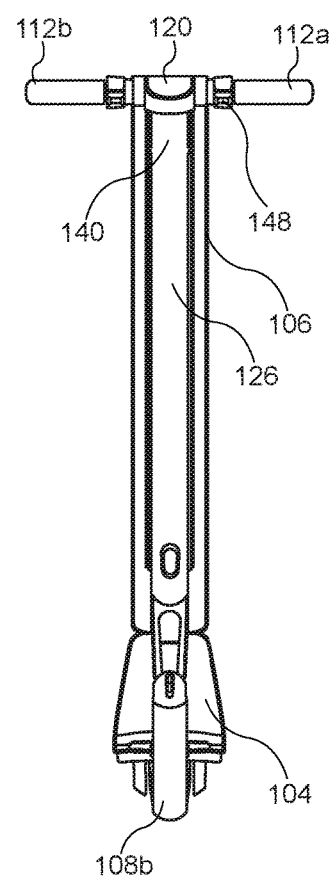
FIG. 8 illustrates a rear view of the mobile connectivity and self-generating illumination electric scooter shown in FIG. 2, in accordance with an embodiment of the present invention.

Turning now to FIG. 8, the scooter 100 is also useful and effective for helping when an irregular event occurs. The event may include an accident, a mechanical breakdown, a robbery, and a natural disaster. In some embodiments, the operator manipulates the help switch 140 to generate a signal. The help switch 140 transmits a signal when an irregular events occurs at or near the electric scooter 100. In one embodiment, the signal from the help switch 140 transmits to a vehicle repair receiver, or a law enforcement receiver, or a medical assistance receiver. In one non-limiting embodiment, the signal is generated by depressing a button near the steering column 126.

The scooter 100 also provides a unique sound system 138 that generates and mixes sound, including audio tapes, music, and other audible entertainment or instructive media. The sound system 138 allows the operator to listen to audio while operating the scooter 100. In some embodiments, the sound system 138 may include, without limitation, a speaker, a mixer, a microphone, a signal processor, an amplifier, and a loudspeaker. The mobile communication device 200 can be used to operate the sound system 138.

Looking back at FIG. 2, the scooter 100 also includes a camera 122 that captures video and images from the front of the scooter 100, such as from the front frame member 106. In some embodiments, the camera 122 is disposed at or near the front frame member 106. Though in other embodiments, the camera 122 can be at the sides or rear of the frame 102 to capture different vantage points. In some embodiments, the camera 122 may be operable to enable livestream viewing of an area near the electric scooter 100. The camera 122 also captures video and images to enable social media synchronization. For example, captured pictures can be uploaded on a social media site, or any website in general. Thus in one possible embodiment, the scooter 100 is a social media broadcasting system.

For example, the mobile communication device 200 commands the camera 122 to capture an image and upload the image to a social media site. In one alternative embodiment, an external camera operatively attaches to the electric scooter and/or electric bike discussed below. The bike and uses the captured image or video to publish, stream, or upload pictures and videos to the public, internet, social media sites. Thus, a user may show live videos of a journey taken by the electric scooter on a social media site, such as Facebook™, or on the user's personal website. The user can upload the image or video directly from the electric scooter, or wait till later to upload after editing the image or video.

Additionally, the mobile communication device 200 commands the sound system 138 to play a music track. The sound may be combined with the video and uploaded to the social media site, as discussed above. The mobile communication device can also monitor the amount of charge in the battery, the distance traveled, maintenance requirements, Wi-Fi hotspot signal strength, and through the integral GPS 150, find local establishments.

The scooter 100 further comprises a global positioning system 150 that is integral in the frame 102. The global positioning system 150 provides geolocation and time information to a global positioning system receiver. Through the global positioning system 150 an operator can view the location of the scooter 100 from a personal mobile communication device 200.

In one exemplary use of the global positioning system 150, the scooter 100 is equipped with a navigation system that incorporates a global positioning system receiver. The GPS receiver has an antenna to receive signals from a satellite network. The scooter navigation system uses the satellite positioning signals to compute coordinates that locate the scooter over the surface of the earth with regard to longitude, latitude, and altitude. The global positioning system 150 is in communication with the mobile communication device 200 to enable the operator to view the position of the scooter 100. Also, with the appropriate map software, the vehicle's location can then be shown on a map visible on the mobile communication device 200.

The scooter 100 may include an integral computer 142 that is operable to regulate the electrical connections and process the wireless communications throughout the scooter 100. The integral computer 142 is also in communication with the mobile communication device 200 through the Wi-Fi hotspot. This allows the computer 142 to tie together the functions of the mobile communication device 200 and the electrical connections and process the wireless communications throughout the scooter 100. In one embodiment, the computer 142 is a processor or a microchip known in the art.

As referenced back in FIG. 1, the scooter 100 is unique in that the mobile communication device 200 is in communication with the integral computer 142, the Wi-Fi hotspot, the sound system 138, the camera 122, the help switch 140, and the global positioning system 150. This allows the computer 142 to process data and communicate the processes data to the mobile communication device 200. This also allows the sound system 138 and camera 122 to be controlled through the mobile communication device 200.

Figure 9A:
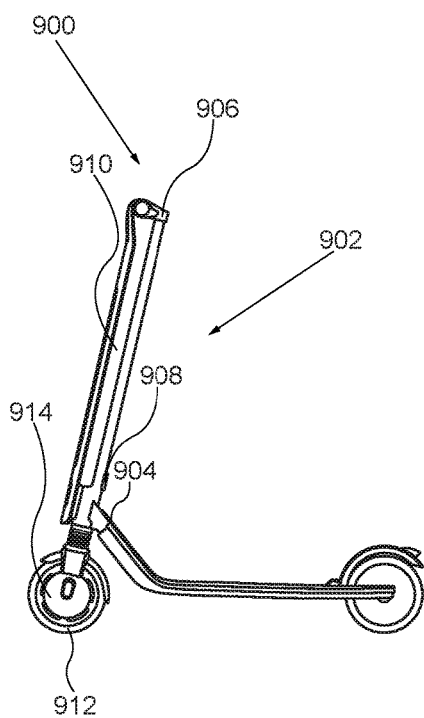
FIGS. 9A and 9B illustrate an alternative electric scooter converted to an electric bike through a modular chassis, where
Figure 9B:
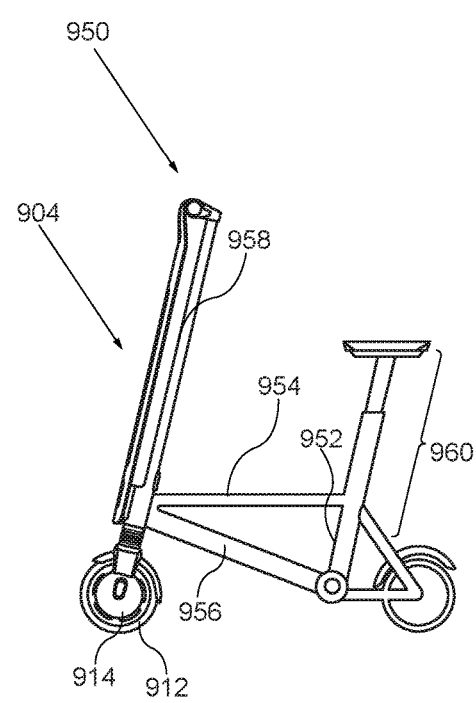

The scooter 100 is also interchangeable to a bike through use of a modular chassis 902 that contains the primary components thereof. This allows for a modular use of electric scooter chassis to create an electric bike 950. As shown in FIGS. 9A and 9B, an alternative electric scooter 900 converts to an electric bike 950 through a modular chassis 902 and a removable seat subassembly 960. FIG. 9A shows the electric scooter 900. The modular chassis 902 encapsulates the front end of the frame 904, providing a protective cover that encapsulates a steering column 910, a front wheel 912, and a motor 914 contained on or in the front wheel 912. Further, a display screen 906 and a battery 908 are enclosed inside the modular chassis 902.

As FIG. 9B shows, the electric bike 950 also utilizes modular chassis 902 and forms through attachment of the seat subassembly 960 to the frame 904. This may include a telescoping attachment with a frame tube 952 at the center section of the frame. The frame tube 952 extends perpendicularly from a lower frame bar 956. A cross bar 954 may also extend from the lower frame bar 956 to the steering column 958 to provide structural integrity. This configuration allows for easy, single-operator conversion between electric scooter 900 and electric bike 950. In one embodiment, the rechargeable battery 132 is located inside the frame in at least one of the following: the frame tube 952, cross bar 954, lower frame bar 956, and steering column 958. However, the rechargeable battery 132 may also be positioned in the front frame member, as described above.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A mobile connectivity and self-generating illumination electric scooter, the scooter comprising:
   a step-through frame comprising a floor platform defined by a front end and a rear end, the floor platform carrying at least two wheels, the wheels being rotatable to advance the scooter,
   the frame further comprising a steering column extending from the floor platform, the steering column terminating at an accelerator handle and a brake handle,
   the frame further comprising a front frame member overlaying the steering column, the front frame member being at least partially transparent,
   the frame further comprising a brake fin operatively connected to the brake handle and at least one of the wheels, wherein the brake fin is operable to at least partially restrict rotation of one of the wheels,
   the frame further comprising a communication device support member disposed between the accelerator handle and the brake handle, the communication device support member operable to enable support of a mobile communication device;
   a rechargeable battery storing electricity, the rechargeable battery disposed between the steering column and the front frame member;
   a device charger in electrical communication with the rechargeable battery, the device charger being proximal to the communication device support member, wherein the device charger is operable to charge the mobile communication device;
   an electric motor in electrical communication with the rechargeable battery, the electric motor disposed on or near at least one of the wheels;
   a daytime running lamp disposed between the steering column and the front frame member, the daytime running lamp automatically illuminating when the electric motor is operational, wherein the daytime running lamp illuminates through the at least partially transparent front frame member;
   an integral router arranged between the accelerator handle and the brake handle;
   a camera disposed at or near the front frame member.

2. The scooter of claim 1, further comprising a plurality of interchangeable floor panels detachably covering the floor platform.

3. The scooter of claim 1, further comprising a plurality of interchangeable front panels detachably covering the front frame member.

4. The scooter of claim 1, wherein the interchangeable floor and front panels include multiple colors and designs.

5. The scooter of claim 1, wherein the camera is configured to capture different vantage point.

6. The scooter of claim 1, further comprising a reflector affixed to the front frame member.

7. The scooter of claim 1, wherein the frame is defined by a glossy finish.

8. The scooter of claim 1, wherein the steering column is about 45 inches long.

9. The scooter of claim 1, wherein the floor platform is about 40 inches long.

10. The scooter of claim 1, wherein the accelerator handle and the brake handle form grips.

11. The scooter of claim 1, wherein the rechargeable battery includes at least one of the following: a lithium-ion battery, a nickel-metal hydride battery, a lead-acid battery, and an ultracapacitor.

12. The scooter of claim 1, wherein the device charger comprises a retractable cord.

13. A mobile connectivity and self-generating illumination electric scooter, the scooter comprising:
   a step-through frame defined by a glossy finish, the frame comprising a floor platform defined by a front end and a rear end, the floor platform carrying at least two wheels, the wheels being rotatable to advance the scooter,
   the frame further comprising a steering column extending from the floor platform, the steering column terminating at an accelerator handle and a brake handle,
   the frame further comprising a front frame member overlaying the steering column, the front frame member being at least partially transparent,
   the frame further comprising a brake fin operatively connected to the brake handle and at least one of the wheels, wherein the brake fin is operable to at least partially restrict rotation of one of the wheels,
   the frame further comprising a communication device support member disposed between the accelerator handle and the brake handle, the communication device support member operable to enable support of a mobile communication device;
   a reflector affixed to the front frame member;
   a plurality of interchangeable floor panels detachably covering the floor platform;
   a plurality of interchangeable front panels detachably covering the front frame member;

a rechargeable battery storing electricity, the rechargeable battery disposed between the steering column and the front frame member;

a device charger in electrical communication with the rechargeable battery, the device charger being proximal to the communication device support member, the device charger comprising a retractable cord, wherein the device charger is operable to charge the mobile communication device through the retractable cord;

an electric motor in electrical communication with the rechargeable battery, the electric motor disposed on or near at least one of the wheels;

a daytime running lamp disposed between the steering column and the front frame member, the daytime running lamp automatically illuminating when the electric motor is operational, wherein the daytime running lamp illuminates through the at least partially transparent front frame member;

an integral router arranged between the accelerator handle and the brake handle;

a camera disposed at or near the front frame member.

14. A mobile connectivity and self-generating illumination electric scooter, the scooter comprising:

a frame defined by a glossy finish, the frame comprising a steering column, a lower frame bar angled connected with the steering column, a V-shaped extended frame extended from the lower frame bar, a frame tube vertically extended from the lower frame bar and connected with the V-shaped extended frame, a crossbar transversely extended from the steering column and connected to the frame tube, a removable seat subassembly extended from the frame tube, and a front frame member overlaying the steering column having a section that is partially transparent;

two wheels being rotatably and respectively arranged on a bottom end of the steering column and a bottom point of the V-shaped extended frame;

an accelerator handle and a brake handle arranged on a top end of the steering column;

a brake fin operatively connected to the brake handle and at least one of the wheels, wherein the brake fin is operable to at least partially restrict rotation of one of the wheels;

a communication device support member disposed between the accelerator handle and the brake handle, the communication device support member operable to enable support of a mobile communication device;

a reflector affixed to the front frame member;

a rechargeable battery storing electricity, the rechargeable battery disposed between the steering column and the front frame member;

a device charger in electrical communication with the rechargeable battery, the device charger being proximal to the communication device support member, the device charger comprising a retractable cord, wherein the device charger is operable to charge the mobile communication device through the retractable cord;

an electric motor in electrical communication with the rechargeable battery, the electric motor disposed on or near at least one of the wheels;

a daytime running lamp disposed between the steering column and the front frame member, the daytime running lamp automatically illuminating when the electric motor is operational, wherein the daytime running lamp illuminates through the partially transparent section;

an integral router arranged between the accelerator handle and the brake handle; and a camera disposed at or near the front frame member.

* * * * *